(12) United States Patent
Moegling et al.

(10) Patent No.: US 8,182,041 B2
(45) Date of Patent: May 22, 2012

(54) SEAT ASSEMBLY HAVING REAR ACTUATED EGRESS MECHANISM

(75) Inventors: Peter James Moegling, West Bloomfield, MI (US); Robert Joseph Hazlewood, Plymouth, MI (US); Todd Rupert Muck, Fowlerville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 111 days.

(21) Appl. No.: 12/627,552

(22) Filed: Nov. 30, 2009

(65) Prior Publication Data
US 2011/0127822 A1 Jun. 2, 2011

(51) Int. Cl.
*B60N 2/02* (2006.01)
(52) U.S. Cl. .................................. 297/378.12
(58) Field of Classification Search ............ 297/378.12, 297/366, 367 R, 378.1
See application file for complete search history.

(56) References Cited

U.S. PATENT DOCUMENTS

| | | | |
|---|---|---|---|
| 3,405,971 A | 10/1968 | Kobrehel | |
| 4,131,316 A | 12/1978 | Pallant et al. | |
| 4,146,267 A * | 3/1979 | Mori et al. | 297/367 R |
| 4,423,904 A | 1/1984 | Crawford | |
| 4,455,049 A * | 6/1984 | Martin | 297/378.12 |
| 4,497,518 A | 2/1985 | Nishimura et al. | |
| 4,660,886 A * | 4/1987 | Terada et al. | 297/367 R |
| 4,750,655 A | 6/1988 | Barry | |
| 4,771,975 A | 9/1988 | Johnson et al. | |
| 4,874,205 A | 10/1989 | Arefinejad et al. | |
| 5,535,640 A * | 7/1996 | Qiu | 74/540 |
| 5,695,247 A | 12/1997 | Premji | |
| 6,048,030 A * | 4/2000 | Kanda et al. | 297/341 |
| 6,132,000 A * | 10/2000 | Tanaka | 297/378.13 |
| 6,328,381 B1 | 12/2001 | Smuk | |
| 6,739,668 B2 | 5/2004 | Coman et al. | |
| 6,749,264 B2 | 6/2004 | Jeong | |
| 6,830,296 B2 | 12/2004 | Kojima | |
| 6,832,815 B2 | 12/2004 | O'Connor | |
| 6,910,739 B2 | 6/2005 | Grable et al. | |
| 7,017,993 B2 | 3/2006 | Niimi et al. | |
| 7,374,242 B2 | 5/2008 | Champ et al. | |
| 7,393,056 B2 | 7/2008 | O'Connor | |
| 7,547,070 B2 | 6/2009 | Nathan et al. | |
| 2002/0152669 A1 | 10/2002 | Harvanek | |
| 2007/0062324 A1 | 3/2007 | Ingraham | |
| 2008/0296951 A1 | 12/2008 | Goshima et al. | |

OTHER PUBLICATIONS

Co-pending U.S. Appl. No. 12/617,799, filed Nov. 13, 2009, pub May 2011.
Co-pending U.S. Appl. No. 12/628,489, filed Dec. 1, 2009, pub Jun. 2011.
Co-pending U.S. Appl. No. 12/430,263, filed Apr. 27, 2009, pub Oct. 2010.

* cited by examiner

*Primary Examiner* — Milton Nelson, Jr.
(74) *Attorney, Agent, or Firm* — Gifford, Krass, Sprinkle, Anderson & Citkowski, P.C.

(57) ABSTRACT

A seat assembly for an automotive vehicle having a rear actuated release mechanism is provided. The seat assembly includes a seat frame, and a seat back pivotally mounted to the seat frame about a pivot axis for movement between a seated position and a stowed position. The seat assembly further includes a release mechanism capable of locking, releasing, and moving the seat back from a seated position to a stowed position. The release mechanism is actuated by a release handle having an elongated slot formed therein. An egress mechanism operable to actuate the release mechanism from the rear of the seat assembly, includes a bracket pivotally attached to the seat frame and having a pin engaged within the slot of the release handle. The rotation of the bracket from a first position to a second position rotates the release handle to actuate the release mechanism to pivot the seat back from the seated position to the stowed position.

4 Claims, 3 Drawing Sheets

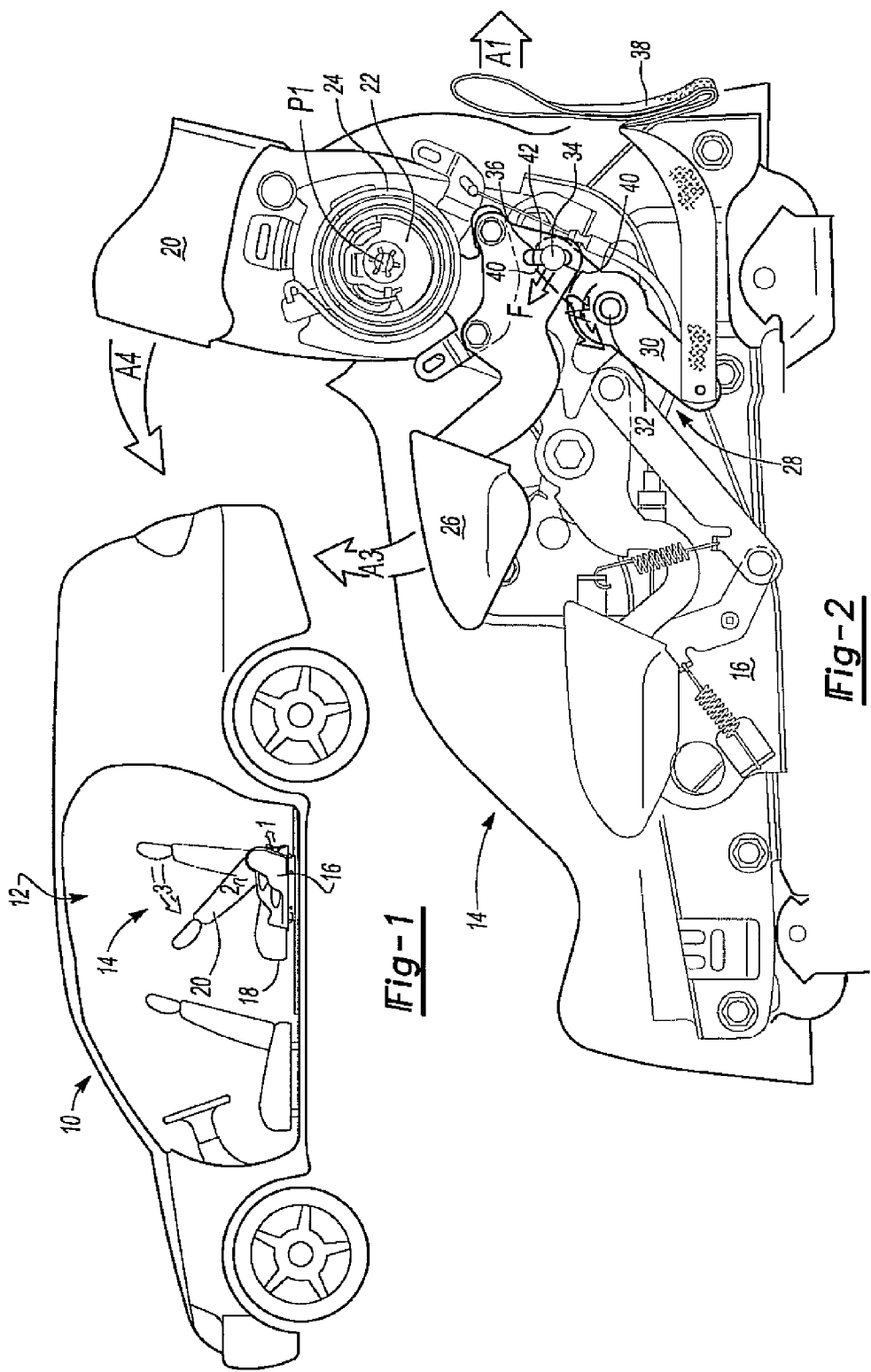

SEAT ASSEMBLY HAVING REAR ACTUATED EGRESS MECHANISM

FIELD OF THE INVENTION

The invention relates to a seat assembly for use in an automotive vehicle. More particularly, the invention relates to a seat assembly having a rear actuated release mechanism capable of operating a release handle to actuate a release mechanism to move a seat back from a seated position to a stowed position.

BACKGROUND OF THE INVENTION

Most modern automotive vehicles include seat assemblies having a recliner or release mechanism actuated by a release handle to pivotally move a seat back from a seated position to a walk-in or stowed position. The stowed position allows an occupant to ingress or egress a second row seating in coupes or third row seating in vans, minivans, or SUVs. In addition, most modern automotive vehicles typically employ an egress mechanism capable of being actuated by an occupant seated behind the seat assembly to move the seat back from the seated position to the stowed position.

It is known in the art to provide an egress mechanism which indirectly actuates the release mechanism. The egress mechanism is operatively attached to the release handle and includes a release strap. A seated occupant pulls the release strap which operates the egress mechanism which actuates the release handle thereby moving the seat back from the seated position to the stowed position to facilitate egress of the occupant from the automotive vehicle.

In the previously known egress mechanism designs, the effort or force required to actuate the egress mechanism varied during the operation cycle. During operation, the force would radically increase causing the occupant to jerk the release strap in order to actuate the egress mechanism. The spiking in force required occurred in prior egress mechanism designs because the release handle included a pin which engaged a slot formed on a rotating bracket. As the pin traveled within the slot the distance between the pivot point of the bracket and the contact point of the pin and the slot would vary, thereby, varying the amount of force required to operate the egress mechanism.

The inconsistent force required raised consumer concerns regarding the quality and reliability of the seat assembly. Accordingly, it is desirable to have a seat assembly having an egress mechanism which eliminates the radical increase in force by an occupant during the operation of the egress mechanism.

SUMMARY OF THE INVENTION

The present invention provides a seat assembly which overcomes the above-mentioned disadvantages.

In brief, a seat assembly for an automotive vehicle having a rear actuated release mechanism is provided. The seat assembly includes a seat frame, and a seat back pivotally mounted to the seat frame about a pivot axis for movement between a seated position and a stowed position. The seat assembly further includes a release mechanism capable of locking, releasing, and moving the seat back from a seated position to a stowed position. The release mechanism is actuated by a release handle having an elongated slot formed therein.

The egress mechanism is operable to actuate the release mechanism from the rear of the seat assembly. The egress mechanism includes a bracket rotatably attached to the seat frame and having a pin engaged within the slot of the release handle. The rotation of the bracket from a first position to a second position rotates the release handle which actuates the release mechanism, thereby, moving the seat back from the seated position to the stowed position. The egress mechanism further includes a release member attached to the bracket.

BRIEF DESCRIPTION OF THE DRAWINGS

A better understanding of the present invention will be had upon reference to the following detailed description when read in conjunction with the accompanying drawings, wherein like reference characters refer to like parts throughout the several views and in which:

FIG. 1 is a partial side view illustrating an automotive vehicle having the inventive seat assembly;

FIG. 2 is a partial side view of the seat assembly illustrating the actuated egress mechanism in a first position;

DETAILED DESCRIPTION OF THE INVENTION

Figure 3:
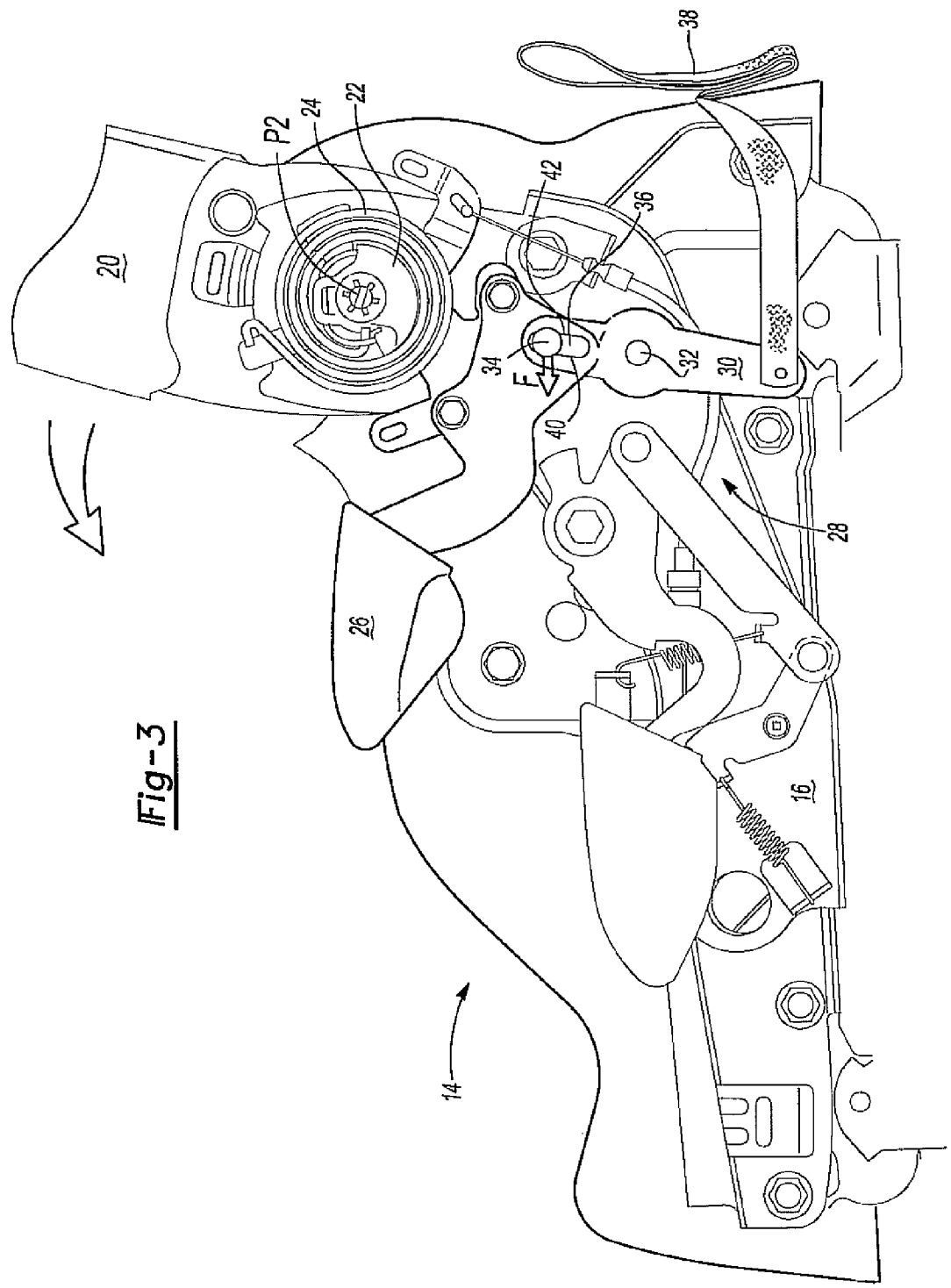
FIG. 3 is a partial side view of the seat assembly illustrating the egress mechanism during the point in the operation cycle at which the release mechanism begins to release the seat back from the seated position.

The present invention has utility as a seat assembly for use in an automotive vehicle which overcomes the above-mentioned disadvantages. The inventive seat assembly provides an occupant seated behind the seat assembly with the quick and easy ability to move the seat back from a seated position to a stowed position. Further, concerns over the quality of the seat assembly, specifically the egress mechanism, are diminished by eliminating the radical increases in force required to operate the egress mechanism.

Referring to FIG. 1, an automotive vehicle is generally indicated at 10. The automotive vehicle includes a passenger compartment 12 having a front row seating, including the driver's seat; a second row seating; and a third row seating (not shown) or additional cargo space. A seat assembly 14 located in the second row seating includes a seat frame 16, a seat cushion 18, and a seat back 20 pivotally coupled to the seat frame 16. The seat back 20 is pivotally movable between a seated position, seen in ghost in FIG. 1, and a stowed position.

The seat frame 16 secures the seat assembly 14 to a floor of the passenger compartment 12. The seat frame 16 is optionally releasably mounted to the floor so that the entire seat assembly 14 may be removed from the passenger compartment 12 of the automotive vehicle 10. In addition, the seat frame 16 is optionally slidably mounted to the floor of the passenger compartment 12 such that the seat assembly 14 is capable of sliding in a fore and aft direction.

Referring to FIG. 2, the seat back 20 is pivotally mounted to the seat frame 16 about a pivot axis P1 for movement between a seated position and a stowed position. A release mechanism 22 is operatively attached to the seat back 20 to lock and release the seat back 20 from the seated position. The release mechanism 22 includes a seat back biasing member 24, such as a clock spring, which continuously biases the seat back 20 towards the stowed position. A release handle 26, which pivots about pivot axis P1, is attached to the release mechanism 22 such that operation of the release handle 26 actuates the release mechanism 22. Once the release mechanism 22 releases the seat back 20 from the seated position the seat back biasing member 24 biases the seat back 20 to the stowed position.

The release mechanism 22 is optionally a disc-type release mechanism operable to lock and release the seat back 20 in the seated position. The disc-type release mechanism includes a rotating plate having gear teeth, on an interior perimeter, which interlock with pawls. When the seat back 20 is locked in the seated position, internal springs provide a constant pressure to a cam which ensures that the pawls remain engaged with the gear teeth of rotating plate. Upon actuation of the release handle 26 by an occupant seated in the seat assembly 14, the cam rotates in a corresponding direction which rotates the pawls so as to disengage the pawls from the gear teeth of the rotating plate. The pawls will reengage the gear teeth upon the release handle returning to the initial position.

It is appreciated, of course, that the seat assembly 14 is operable in conjunction with any known type release mechanism, including those having integrated recline position allowing the seat back 20 to move from reclined seated positions to the stowed position.

The release mechanism 22 is operable to be actuated from a rear end of the seat assembly 14 by an egress mechanism 28. The egress mechanism allows an occupant seated behind the seat assembly 14 to operate the release handle 26 thereby moving the seat back 20 from the seated position to the stowed position. The egress mechanism 28 includes a rotating bracket 30 and a release member 38. The bracket 30, known as a helicopter bracket, is rotatably mounted to the seat frame 16 at a rotation point 32. A pin 34 extends outwardly from a first end of the bracket 30. The pin 34 engages with an elongated slot 36 formed in the release handle 26.

One end of the release member 38 is attached to a second end of the bracket 30 at an attachment point that is spaced apart from the rotation point 32 of the bracket 30. The opposite end of the release member 38 extends beyond the rear of the seat assembly 14. The bracket 30 is dimensioned such that the distance between the rotation point 32 and the pin 34 is equal to or a ratio of the distance between the rotation point 32 and the attachment point of the bracket 30 and the one end of the release member 38 depending on the desired mechanical advantage and target effort. The release member 38 is, optionally, a strap made of a flexible material having a loop to facilitate grasping by an occupant disposed on the end extending beyond the rear of the seat assembly. It is appreciated, of course, that the release member is not limited to such an embodiment.

In order to facilitate a better understanding of the principles associated with the inventive seat assembly 14, the operation of moving the seat back 20 from a seated position to a stowed position from the rear of the seat assembly 14 will now be described. As seen in FIG. 2, the seat back 20 is in the seated position and the egress mechanism 28, including the bracket 30 and the release member 38, are in the first position. An occupant actuates the egress mechanism 28 by grasping the release member 38 and pulling in the direction of A1. The bracket 30 is rotated counterclockwise in the direction of A2 causing the pin 34 to engage the front side 40 of slot 36 in the direction of arrow F.

The pin 34 travels within slot 36 while acting upon the front side 40 forcing the release handle 26 to rotate about pivot axis P1 in the direction of A3. The rotation of release handle 26 operates the release mechanism 22 thereby releasing the seat back 20 from the seated position. Once the release mechanism 22 disengages the seat back 20 from the seated position, the seat back biasing member 24 will bias the seat back 20 towards the stowed position in the direction of A4 as seen in FIG. 2.

Referring to FIG. 3, the egress mechanism 28 is shown partially through the operation cycle of moving from the initial, first position to the operated, second position. FIG. 3, illustrates the point during the operation cycle in which the release mechanism 22 releases the seat back 20 form the seated position. The pin 34 and the slot 36 are oriented such that during the release point of the release mechanism 22, as seen in FIG. 3, the force direction arrow F of the pin 34 is generally perpendicular to the front side 40 of the slot 36. A greater percentage of the rotating force of the bracket 30 is imparted by the pin 34 onto the front side 40 of the slot 36, due to the perpendicular direction of arrow F with respect to the front side 40 of slot 36. As such, the force required to operate the egress mechanism 28 is the smallest as the release mechanism 22 releases the seat back 20 from the seated position.

Figure 4:
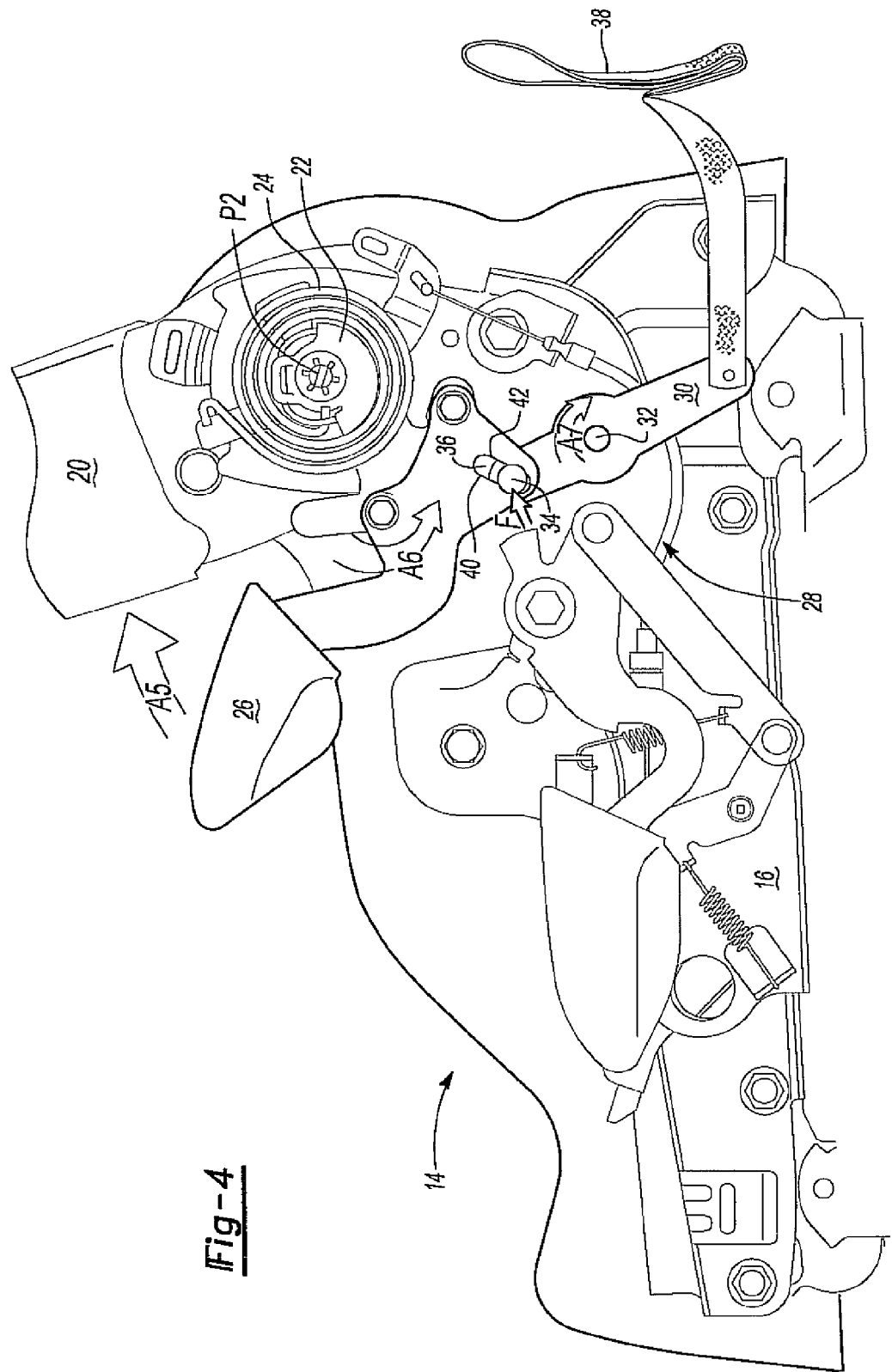
FIG. 4 is a partial side view of the seat assembly illustrating the egress mechanism in the second position.

As seen in FIG. 4, the seat back 20 is in the stowed position and the egress mechanism 28 is in the second position. To return the seat back 20 to the seated position, an occupant pushes the seat back 20 in the direction of A5 which rotates the release handle 26 in the direction of A6. The pin 34 engages a back side 42 of the slot 36 in the direction of arrow F. The pin travels within the slot 26 while acting upon the back side 42 of the slot 36, which rotates the bracket 30 in the direction of A7. Once the seat back 20 is in the seated position the release mechanism 22 will lock the seat back 20 in the seated position, the release handle 26 will be returned to the initial position, and the egress mechanism 28 will be returned to the first position as seen in FIG. 2.

The egress mechanism 28 is advantageous over the previously known rear actuated egress mechanisms as the force required by the occupant in the direction of A1 does not spike during operation. Further, as the inventive seat assembly includes a bracket having a pin engaging with a slot formed in the handle, the distance between the pivot point of the bracket and the contact point between the pin and the slot is constant during the entire operation cycle. In addition, the egress mechanism 28 avoids cinching the pin 34 within the slot 36 by dimensioning the slot 36 such that the pin 34 is spaced apart from either end of the slot 36 in both the first position and the second position, as seen in FIGS. 2 and 4, respectively.

The invention has been described in an illustrative manner. It is therefore to be understood that the terminology used is intended to be in the nature of words of description rather than of limitation. Many modifications and variations of the invention are possible in light of the above teachings. Thus within the scope of the appended claims the invention may be practiced other than as specifically described.

It is claimed:

1. A seat assembly for supporting an occupant in a passenger compartment of an automotive vehicle, said seat assembly comprising:

a seat frame;

a seat back mounted to said seat frame to pivot about an axis between a seated position and a stowed position;

a release mechanism having a release handle, said release handle having an elongated slot, said release handle operable to actuate said release mechanism to move said seat back from said seated position to said stowed position;

a bracket having a first end and an opposite second end, said bracket rotatably mounted to said seat frame to rotate about a rotation point, said bracket having a pin extending outwardly from said first end, said pin being engaged within said slot of said release handle; and a release member having one end attached to said second end of said bracket at an attachment point, an opposite end of said release member extends beyond a rear end of said seat assembly, said attachment point being spaced apart from said rotation point such that said rotation point of said bracket is positioned between said pin and said attachment point;

wherein upon actuation of said release member said bracket rotates from a first position to a second position thereby rotating said release handle to actuate said release mechanism to move said seat back from said seated position to said stowed position.

2. The seat assembly of claim 1, wherein a distance between said rotation point and said pin is equal to a distance between said rotation point and said attachment point.

3. The seat assembly of claim 1, wherein movement of said seat back from said stowed position to said seated position rotates said bracket from said second position to said first position.

4. The seat assembly of claim 1, wherein said slot has a pair of opposed ends, and wherein said pin is spaced apart from either of said pair of opposed ends when said bracket is in said first position or in said second position.

* * * * *